US010369945B2

(12) United States Patent
Gruebl et al.

(10) Patent No.: US 10,369,945 B2
(45) Date of Patent: Aug. 6, 2019

(54) RELEASABLE FASTENING ASSEMBLY FOR FASTENING A BUMPER TO A SIDE PANEL AND/OR A FENDER OF A MOTOR VEHICLE

(71) Applicant: Bayerische Motoren Werke Aktiengesellschaft, Munich (DE)

(72) Inventors: Josef Gruebl, Neumarkt-St.Veit (DE); Markus Hauzeneder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/729,770

(22) Filed: Oct. 11, 2017

(65) Prior Publication Data

US 2018/0029551 A1    Feb. 1, 2018

Related U.S. Application Data

(63) Continuation of application No. PCT/EP2016/057508, filed on Apr. 6, 2016.

(30) Foreign Application Priority Data

Apr. 15, 2015   (DE) ........................ 10 2015 206 751

(51) Int. Cl.
  *B60R 19/24*   (2006.01)
  *B60R 19/38*   (2006.01)
(52) U.S. Cl.
  CPC .............. *B60R 19/24* (2013.01); *B60R 19/38* (2013.01); *B60R 2019/247* (2013.01)

(58) Field of Classification Search
  CPC ......... B60R 19/24; B60R 19/26; B60R 19/30; B60R 19/38; B60R 2019/247
  (Continued)

(56) References Cited

U.S. PATENT DOCUMENTS 4,753,467 A * 6/1988 DeCaluwe .............. B60R 13/04
                                                  293/124
4,875,728 A * 10/1989 Copp ...................... B60R 19/24
                                                  293/126
(Continued)

FOREIGN PATENT DOCUMENTS

DE   10 2007 019 935 A1   11/2008
DE   10 2009 035 148 A1    2/2010
(Continued)

OTHER PUBLICATIONS

German-language Search Report issued in counterpart German Application No. 10 2015 206 751.3 dated Jan. 27, 2016 with partial English translation (15 pages).
(Continued)

*Primary Examiner* — Dennis H Pedder
(74) *Attorney, Agent, or Firm* — Crowell & Moring LLP (57) ABSTRACT

A fastening arrangement is provided in order to reduce damage to a bumper and a side panel and/or a fender of a motor vehicle connected by way of a supporting element in a low speed range. The supporting element has a first supporting strip that can be fastened to the side panel and/or the fender and a second supporting strip that can be fastened to the bumper. At least one holder is provided, which releasably connects the first supporting strip and the second supporting strip to each other.

14 Claims, 5 Drawing Sheets

(58) Field of Classification Search
USPC .................................................. 293/154, 155
See application file for complete search history.

(56) References Cited

U.S. PATENT DOCUMENTS

| | | | | |
|---|---|---|---|---|
| 5,915,767 | A * | 6/1999 | Hosoda | ................... B60R 19/24 |
| | | | | 280/848 |
| 7,086,679 | B2 * | 8/2006 | Andre | ................... B62D 25/163 |
| | | | | 293/155 |
| 7,540,550 | B1 * | 6/2009 | Huber | .................... B60R 19/24 |
| | | | | 293/120 |
| 2006/0012203 | A1 * | 1/2006 | Andre | ................... B62D 25/163 |
| | | | | 296/29 |

FOREIGN PATENT DOCUMENTS

| | | |
|---|---|---|
| DE | 10 2011 117 326 A1 | 5/2012 |
| DE | 10 2012 103 417 A1 | 10/2013 |
| DE | 10 2013 112 846 A1 | 5/2015 |
| FR | 2 994 556 A1 | 2/2014 |
| JP | 60-158952 U | 10/1985 |
| JP | 61-161150 U | 10/1986 |
| JP | 1-126856 U | 8/1989 |
| JP | 9-216542 A | 8/1997 |
| JP | 2002-321577 A | 11/2002 |

OTHER PUBLICATIONS

International Search Report (PCT/ISA/210) issued in PCT Application No. PCT/EP2016/057508 dated Jul. 6, 2016 with English translation (7 pages).

* cited by examiner

RELEASABLE FASTENING ASSEMBLY FOR FASTENING A BUMPER TO A SIDE PANEL AND/OR A FENDER OF A MOTOR VEHICLE

CROSS REFERENCE TO RELATED APPLICATIONS

This application is a continuation of PCT International Application No. PCT/EP2016/057508, filed Apr. 6, 2016, which claims priority under 35 U.S.C. § 119 from German Patent Application No. 10 2015 206 751.3, filed Apr. 15, 2015, the entire disclosures of which are herein expressly incorporated by reference.

BACKGROUND AND SUMMARY OF THE INVENTION

The present invention relates to a fastening arrangement for fastening a bumper to a side panel and/or to a fender of a motor vehicle by way of a supporting element. Furthermore, the invention relates to a correspondingly equipped motor vehicle.

DE 10 2009 035 148 A1 discloses a supporting element for fastening a bumper to a side panel and/or to a fender of a motor vehicle. All of the elements are fixed together by way of screws, thereby allowing the defined holding thereof during the normal driving states of the motor vehicle. However, in the event of a collision, fixing proves to be disadvantageous, since the kinetic energy acting on the bumper also acts directly on the side panel and/or fender and plastically deforms the latter. This effect, which is in no way desirable, also occurs in the event of frontal crashes at a comparatively low speed, i.e. at speeds of up to around 18 km/h, or minor crashes, and results in high repair costs.

The object of the present invention is to overcome the abovementioned disadvantages of the prior art.

This and other objects are achieved by a fastening arrangement for fastening a bumper to a side panel and/or to a fender of a motor vehicle by way of a supporting element, wherein the supporting element comprises a first supporting strip that is fastenable to the side panel and/or to the fender, and a second supporting strip that is fastenable to the bumper. At least one holder is provided, which connects the first supporting strip and the second supporting strip releasably together.

In the event of an accident, in particular an accident at a comparatively low speed of up to about 18 km/h, or in the event of a minor accident, the vehicle components connected together by means of the first supporting strip and the second supporting strip can be released without one of the two being damaged. This means in particular that the bumper can be released from the side panel and/or fender without the latter being plastically deformed. The releasable connection provided according to the invention thus ensures a connection during a normal state of the motor vehicle, and also ensures that the above-described components are released during an accident. Advantageously, this thus ensures that, on account of the releasable configuration of the two supporting strips, any repair costs brought about by a minor accident are reduced or even avoided completely.

A particularly simple configuration of the holder connecting the first supporting strip to the second supporting strip is provided when the holder is in the form of a clip which encloses the two supporting strips that are located next to one another in the assembled state of the motor vehicle and preloads them with respect to one another. In the event of a collision, the clip releases in a simple manner such that the two supporting strips and, as a result, the bumper are released from the side panel and/or fender of the motor vehicle. As a result, damage to the fender which generally consists of metal or to the side panel which consists of metal is effectively avoided. The clip itself can advantageously extend over a large part of the contact region of the first supporting strip and the second supporting strip and/or enclose the latter at discrete points and press them against one another.

In a further preferred embodiment of the fastening arrangement according to the invention, the holder is provided as a fastener which is fastened to the first supporting strip and to the second supporting strip and extends along the bumper and through the side panel and/or fender.

For easier assembly of the first supporting strip with the second supporting strip, provision is made for the first supporting strip to have at least one receptacle for receiving a centering element that projects from the second supporting strip.

For even easier assembly with, at the same time, improved separation of the bumper from the side panel and/or fender in the event of a minor accident, provision can advantageously be made for the centering element that projects from the second supporting strip to extend through the bumper and along the side panel and/or fender.

The assembly of the second supporting strip on the bumper is rendered easier when said second supporting strip has at least one centering element which is received in a corresponding receptacle in the bumper.

When the first supporting strip and/or the second supporting strip is or are made of plastics material, it is advantageously possible to create not only a cost-effective fastening arrangement according to the invention but also an elastic, deformable fastening arrangement, on account of which the kinetic energy that arises during a minor accident can be partially or even entirely absorbed without the side panel and/or fender being plastically deformed.

When a centering pin or cross pin is used as the centering element, it is advantageously possible for components that are known per se and are well-established in practice and cost-effective to be used in the fastening arrangement according to the invention.

In order to make it easier for the bumper to become detached from the side panel and/or fender in the event of a minor accident, the second supporting strip may be configured with a greater modulus of elasticity than the first supporting strip.

The abovementioned object is likewise achieved by a motor vehicle which has a fastening arrangement of the above-described type. The above-described advantages apply in a corresponding manner.

Other objects, advantages and novel features of the present invention will become apparent from the following detailed description of one or more preferred embodiments when considered in conjunction with the accompanying drawings.

DETAILED DESCRIPTION OF THE DRAWINGS

A detailed, nonprejudicial, in particular nonlimiting, description of exemplary embodiments of the present invention is given in the following text with reference to FIGS. 1A to 3B. Identical elements have been provided with identical reference signs, unless specified to the contrary.

Figure 1A:
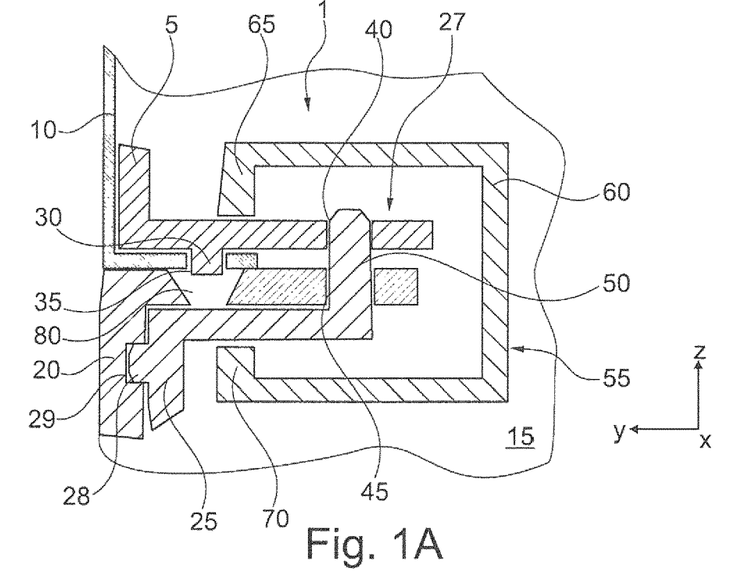
FIG. 1A is a schematic side view of a fastening arrangement according to an embodiment of the invention in cross section in a normal state of a motor vehicle.

FIG. 1A shows a fastening arrangement 1 according to the invention in a schematic sectional view in a normal state, i.e. outside of an accident situation. A first supporting strip 5 is fastened to a side panel 10 of a motor vehicle 15 by way of connectors (not illustrated), for example screws. Alternatively or additionally, the element depicted in FIG. 1A with the reference sign 10 can also be a fender of a motor vehicle 15; in this respect, the side panel 10 and the fender 10 should be understood as being synonymous or interchangeable within the meaning of the invention.

The lower region, shown in FIG. 1A, of the side panel 10 and/or fender 10 bears against a bumper 20 of the motor vehicle 15. The bumper 20 itself is fastened to a second supporting strip 25 by way of connectors (not illustrated), for example screws. It should be noted that the term "bumper" 20, considered technically, can include not only the bumper proper but also the cladding thereof. For the purpose of improved orientation of the second supporting strip 25 on the bumper 20, provision is made for centering device 28 provided on the second supporting strip 25 to project into corresponding receptacles 29 provided in the bumper 20. The first supporting strip 5 and the second supporting strip 25 together form a supporting element 27.

In order to create a sufficiently large contact area in the region in which it bears against the side panel 10 and/or fender 10, the first supporting strip 5 is formed congruently with the latter. For easier assembly of the two abovementioned elements, the side panel 10 and/or fender 10 has an opening 30 through which a centering device 35 or centering element provided on the first supporting strip 5 projects. It goes without saying that a series of openings 30 and corresponding centering devices 35 can be provided along the length of the first supporting strip 5 and of the side panel and/or fender 10. During the process of assembling a motor vehicle 15 provided with the fastening arrangement 1 according to the invention, or in the case of the latter being repaired after a minor accident, it is thus easily possible to be able to quickly and precisely orient the first supporting strip 5 and the side panel and/or fender 10 with respect to one another.

At its end that is remote from the side panel and/or fender 10, the first supporting strip 5 has an opening 40 which is aligned with an opening 45 provided in the bumper 20. At its end remote from the bumper 20, the second supporting strip 25 has a centering device 50 which projects both through the opening 40 in the first supporting strip 5 and through the opening 45 in the bumper 20. In this way, the first supporting strip 5 is oriented precisely with respect to the side panel and/or fender 10 and the second supporting strip 25 is oriented precisely with respect to the bumper 20. For the purposes of a releasable connection of the side panel and/or fender 10 and the bumper 20, a holder 55 is provided, which is in the form of a clip 60 in the exemplary embodiment shown here. The clip 60 is resiliently pretensioned such that the arm 65 thereof that is shown at the top in FIG. 1A presses the first supporting strip 5 against the side panel and/or fender 10 and the bottom arm 70 thereof shown in FIG. 1A presses the second supporting strip 25 against the bumper 20. This fastening arrangement 1 according to the invention ensures a precise, loadable and durable connection of the side panel and/or fender 10 and the bumper 20.

Figure 1B:
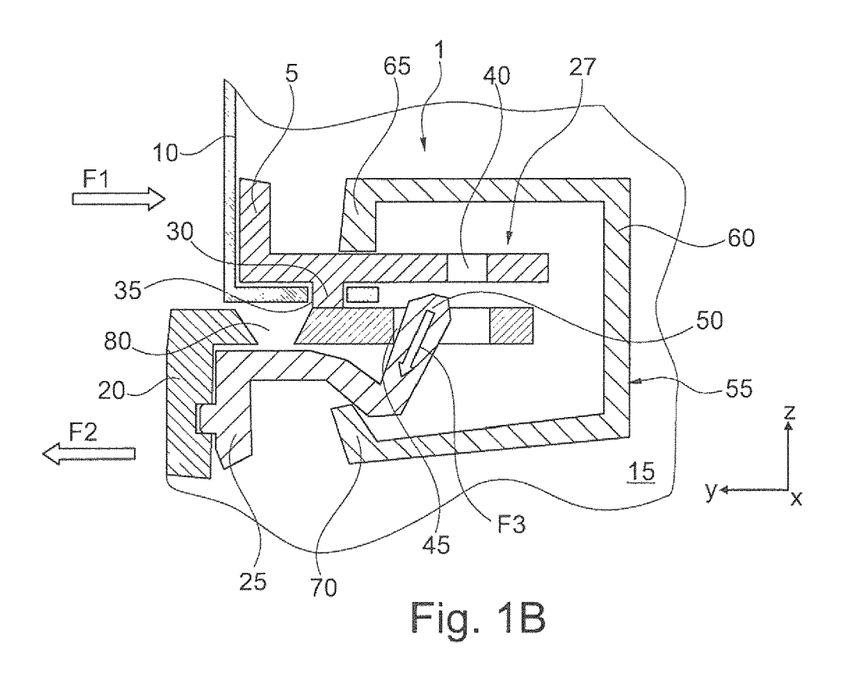
FIG. 1B shows the fastening arrangement illustrated in FIG. 1A in the event of a minor accident.

The fastening arrangement 1 shown in FIG. 1A is shown in FIG. 1B during a minor accident, or an accident at a comparatively low speed, in particular around 18 km/h. In such a case, the side panel and/or fender 10 and the bumper 20 execute a relative movement illustrated by the arrows F1 and F2, respectively. In order to avoid high repair costs, in particular if the side panel 10 that consists of metal and/or the fender 10 that consists of metal are damaged, the elastically configured centering device 50 of the second supporting strip 25 can slide out of the opening 40 in the first supporting strip 5 and out of the opening 45 in the second supporting strip 25 and move in a freeing direction that is illustrated by the arrow F3. In this case, the second supporting strip 25 overcomes the holding force exerted by the arm 70 of the clip 60, such that it can move entirely out of the clip 60 (this not being shown here), with the result that the bumper 20 is removed entirely from the side panel and/or fender 10. Accident-related plastic deformation of the side panel and/or fender 10 is thus advantageously avoided.

Figure 2A:
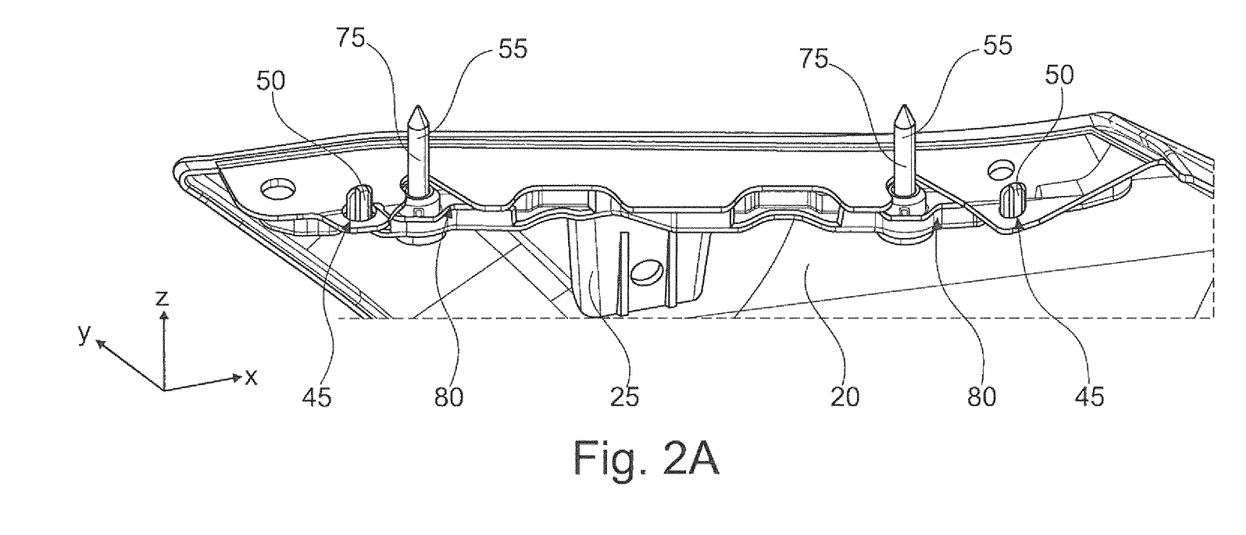
FIG. 2A is a perspective plan view of a part of an alternative fastening arrangement according to the invention.
Figure 2B:
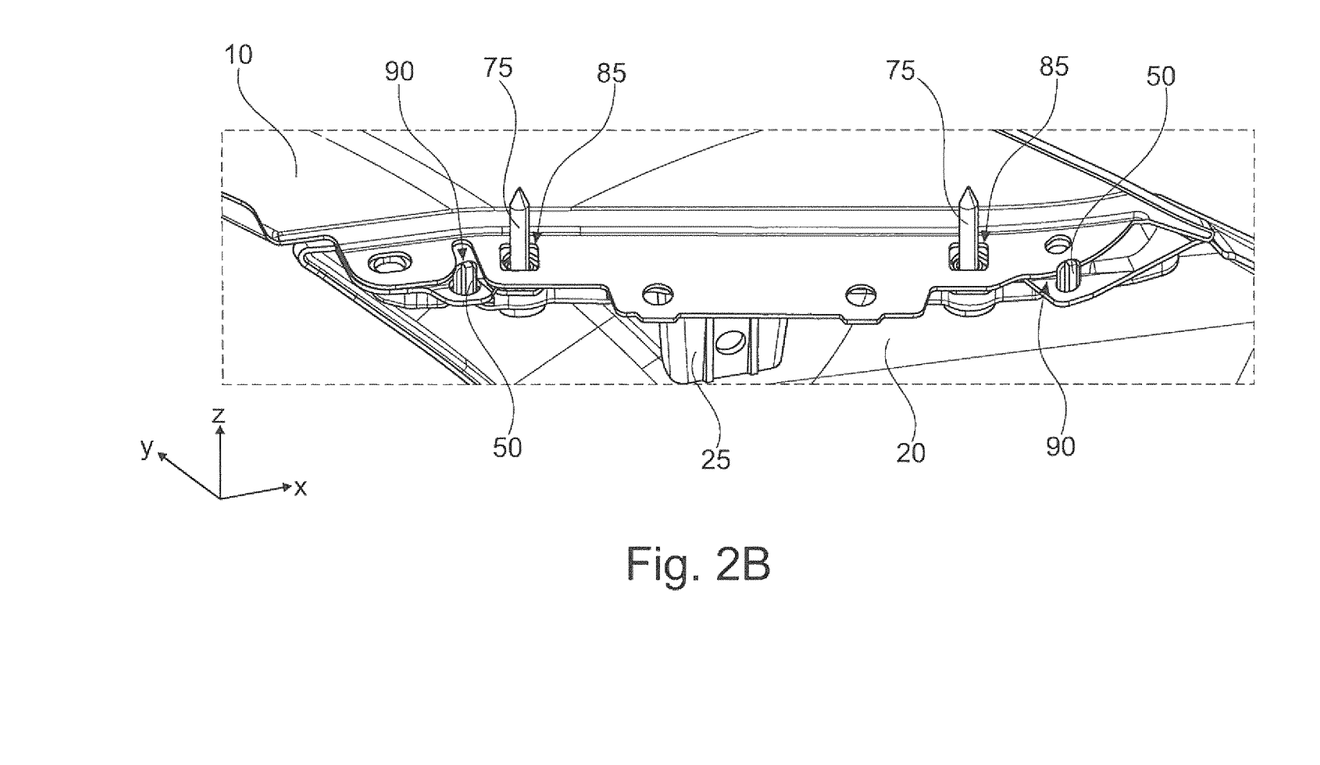
FIG. 2B shows the fastening arrangement illustrated in FIG. 2A, which has been supplemented by a partially depicted side panel.
Figure 2C:
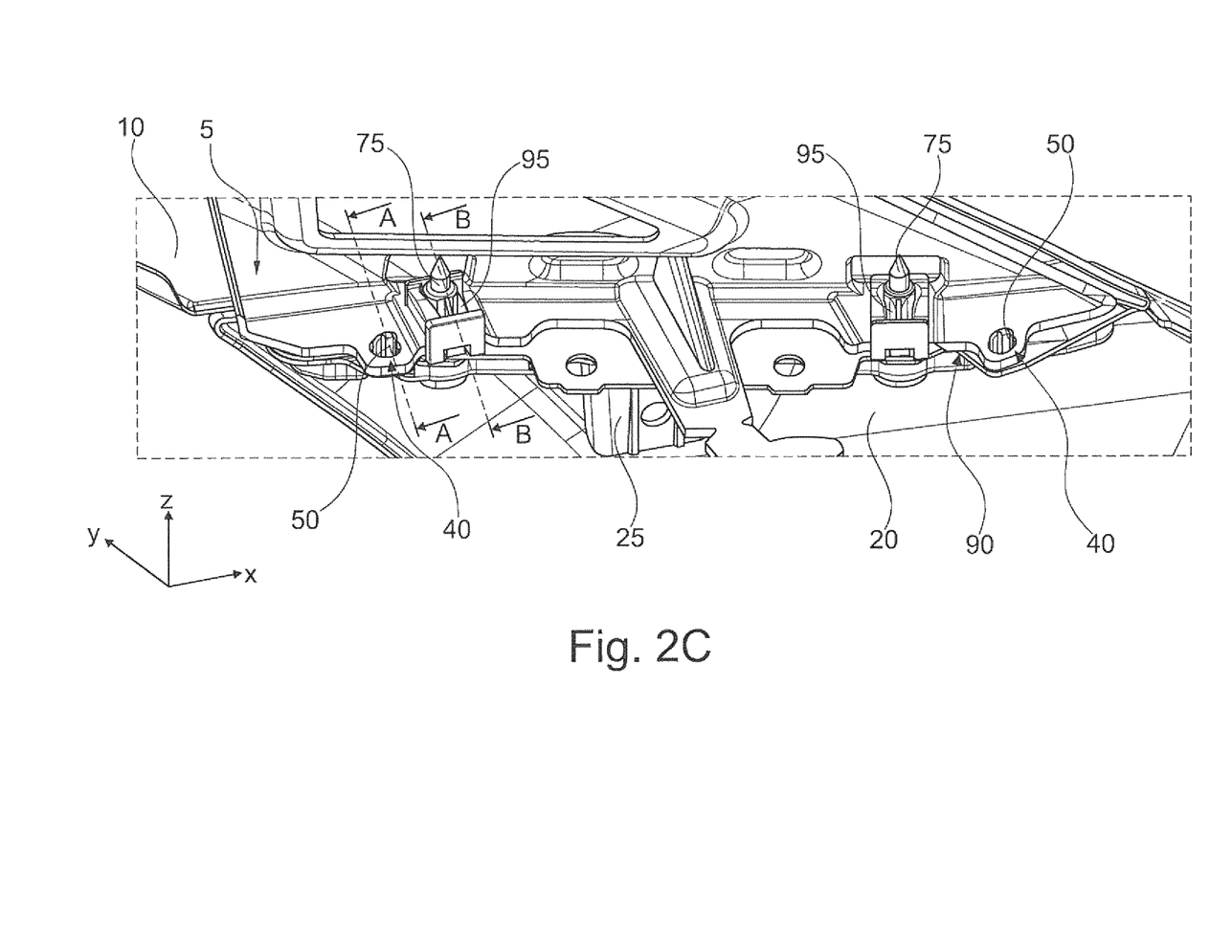
FIG. 2C shows the fastening arrangement illustrated in FIG. 2B, which has been supplemented by a partially depicted first supporting strip.

FIGS. 2A to 2C illustrate an alternative embodiment of a fastening arrangement 1 with, in particular, a different holder 55 than the one shown in FIGS. 1A and 1B.

As can be gathered from FIG. 2A, a second supporting strip 25 is fastened to a bumper 20. For the purposes of easier assembly, the second supporting strip 25 illustrated here has two centering devices 50, which extend through respective openings 45 provided in the bumper 20.

In this exemplary embodiment, the holders 55 consists of two screws 75 which are fastened to the second supporting strip 25 and extend upward in FIG. 2A. In this case, it is important to note that the holders 55, or the two screws 75, are not fastened to the bumper 20, but extend upward along the latter in FIG. 2A, without being in contact therewith in any way. Instead, in that part of the bumper 20 that is adjacent to the holders 55 (or the screws 75), cutouts 80 are provided which allow a contact-free relative movement between the two screws 75 and the bumper 20.

The fastening arrangement 1 shown in FIG. 2A is, as can be gathered from FIG. 2B, supplemented by a side panel and/or fender 10 (in each case partially illustrated). Said side panel and/or fender 10 has cutouts 85, through which the holders 55 (or screws 75), can project. The cutouts 85 are dimensioned such that a spacing is provided between the screws 75 and the side panel and/or fender 10. It should be noted that the holders 55 (or screws 75), thus are nevertheless surrounded by the material that makes up the side panel and/or fender 10 in spite of this spacing. The holders 55 (or screws 75), do not extend along the bumper, as in the description given for FIG. 2A, but project through the side panel and/or fender 10.

In contrast thereto, the centering devices 50 of the second supporting strip 25 extend along the side panel and/or fender 10 without touching the latter. The side panel and/or fender 10 has cutouts 90 in the exemplary embodiment shown here, such that the centering devices 50 are spaced apart from the side panel and/or fender 10.

The fastening arrangement 1 shown in FIG. 2B is, according to FIG. 2C, supplemented by the first supporting strip 5. The centering devices 50 in this case extend through the openings 40 in the first supporting strip 5, such that the latter is oriented with respect to the second supporting strip 25. The holders 55 (or screws 75), are each fixed in a fastening portion 95 that is provided on the first supporting strip 5 and has a thread (not shown here) that cooperates with the screws 75. With the aid of the holders 55 fixed to the fastening portions 95, it is thus possible to connect the side panel and/or fender 10 to the first supporting strip 5 and the bumper 20 to the second supporting strip 25 in a secure and uncomplicated manner. At the same time, on account of the provided cutouts 80 and 90, it is possible for a relative movement of the side panel and/or fender 10 and bumper 20 to take place in the event of a minor accident, or an accident at a comparatively low speed, such that the risk of damage to the side panel and/or fender 10 is reduced.

Figure 3A:
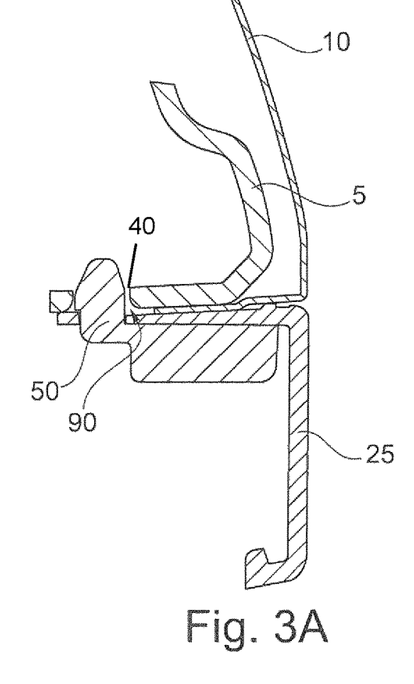
FIG. 3A illustrates a cross section along the section line A-A shown in FIG. 2C.

In order to clarify this attachment, a cross section along the line A-A in FIG. 2C is shown in FIG. 3A. The centering device 50 extends both through the opening 40 in the first supporting strip 5 and through the opening 45 in the bumper 20. As is likewise clearly apparent from FIG. 3A, the centering device 50 extends along the side panel and/or fender 10 without being entirely surrounded thereby. This creates space for a relative movement of the bumper 20 with respect to the side panel and/or fender 10 in the event of a minor accident.

Figure 3B:
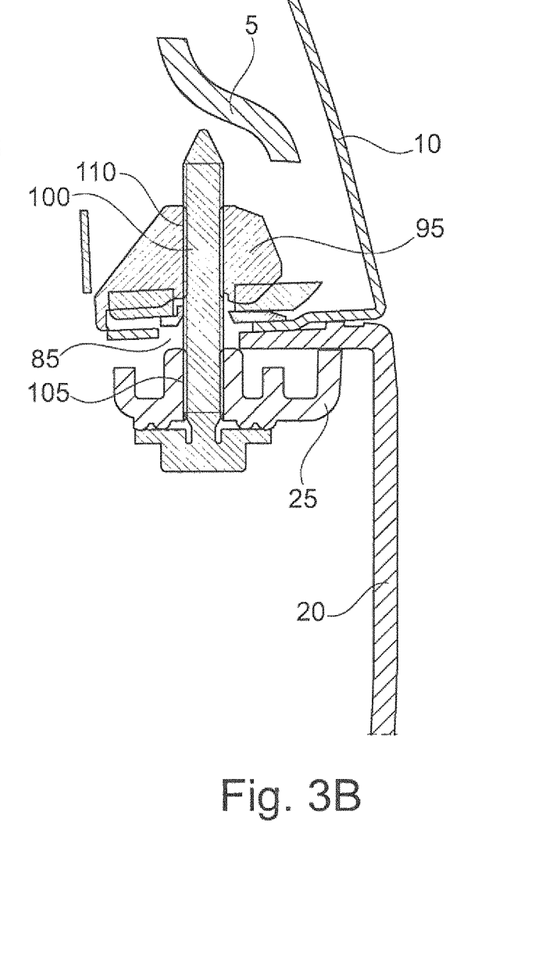
FIG. 3B illustrates a cross section along the section line B-B in FIG. 2C.

FIG. 3B shows a detail of the fastening arrangement 1 according to the invention along a cross section B-B in FIG. 2C. The holder 55 (or screw 75), in this case extends through the second supporting strip 25 and through the cutout 85 provided in the side panel and/or fender 10, as far as the fastening portion 95 of the first supporting strip 5. In this case, a threaded portion 100 provided on the screw 75 cooperates with a threaded portion 105 provided on the second supporting strip 25 and with a threaded portion 110 provided on the first supporting strip 5 such that said components are braced with respect to one another or fixed together. As is likewise clearly apparent from FIG. 3B, the holder 55 does not extend through the bumper 20 but only along the latter in the cutout 80 provided for this purpose.

It should be noted that the first supporting strip 5 and/or the second supporting strip 25 can be made of plastics material. The centering device 50 can be in the form of a centering pin or cross pin. The first supporting strip 5 and the second supporting strip 25 can have different moduli of elasticity. In particular, it is possible for the modulus of elasticity of the second supporting strip 25 to be less than the modulus of elasticity of the first supporting strip 5.

LIST OF REFERENCE SIGNS

1 Fastening arrangement
5 First supporting strip
10 Side panel/fender
15 Motor vehicle
20 Bumper
25 Second supporting strip
27 Supporting element
28 Centering device
29 Receptacle
30 Receptacle
35 Centering device
40 Receptacle
45 Receptacle
50 Centering device
55 Holder
60 Clip
65 Arm
70 Arm
75 Screw
80 Cutout
85 Cutout
90 Cutout
95 Fastening portion
100 Threaded portion
105 Threaded portion
110 Threaded portion
F1, F2 Directions of relative movement
F3 Freeing direction
x,y,z Cartesian vehicle-oriented coordinate system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fastening arrangement for fastening a bumper to a side panel or to a fender of a motor vehicle, comprising:
   a supporting element that fastens the bumper to the side panel or the fender, the supporting element comprising:
   a first supporting strip that is fastenable to the side panel or the fender, and
   a second supporting strip that is fastenable to the bumper, wherein
   at least one holder is provided separately from the first and second supporting strips and connects the first supporting strip and the second supporting strip releasably together,
   in an event of a collision of the motor vehicle, the bumper is releasable, by way of the at least one holder, from the side panel or the fender without the side panel or the fender being damaged, and
   the holder is a clip that is resiliently pretensioned such that when assembled in the motor vehicle, a first arm of the clip presses the first supporting strip against the side panel or the fender and a second arm of the clip presses the second support strip against the bumper.

2. A fastening arrangement for fastening a bumper to a side panel or to a fender of a motor vehicle, comprising:
   a supporting element that fastens the bumper to the side panel or the fender, the supporting element comprising:
   a first supporting strip that is fastenable to the side panel or the fender, and
   a second supporting strip that is fastenable to the bumper, wherein
   at least one holder is provided separately from the second supporting strip and connects the first supporting strip and the second supporting strip releasably together,
   in an event of a collision of the motor vehicle, the bumper is releasable, by way of the at least one holder, from the side panel or the fender without the side panel or the fender being damaged, and
   the holder is a fastener which is fastened to the first supporting strip and to the second supporting strip and extends along the bumper and through the side panel or the fender.

3. The fastening arrangement as claimed in claim 1, wherein the first supporting strip has at least one receptacle for receiving a centering device that projects from the second supporting strip.

4. The fastening arrangement as claimed in claim 3, wherein the centering device extends through the bumper and along the side panel or the fender.

5. The fastening arrangement as claimed in claim 1, wherein the second supporting strip has at least one centering device which is received in a corresponding receptacle in the bumper.

6. The fastening arrangement as claimed in claim 3, wherein the second supporting strip has at least one centering device which is received in a corresponding receptacle in the bumper.

7. The fastening arrangement as claimed in claim 4, wherein the second supporting strip has at least one centering device which is received in a corresponding receptacle in the bumper.

8. The fastening arrangement as claimed in claim 1, wherein at least one of:
the first supporting strip and the second supporting strip is made of plastics material.

9. The fastening arrangement as claimed in claim 3, wherein the centering device is a centering pin or cross pin.

10. The fastening arrangement as claimed in claim 5, wherein the centering device is a centering pin or cross pin.

11. The fastening arrangement as claimed in claim 1, wherein the second supporting strip has a greater modulus of elasticity than the first supporting strip.

12. A motor vehicle, comprising:
a fastening arrangement for fastening a bumper to a side panel or to a fender of the motor vehicle, comprising:
a supporting element that fastens the bumper to the side panel or the fender, the supporting element comprising:
a first supporting strip that is fastenable to the side panel or the fender, and
a second supporting strip that is fastenable to the bumper, wherein
at least one holder is provided separately from the first and second supporting strips and connects the first supporting strip and the second supporting strip releasably together,
in an event of a collision of the motor vehicle, the bumper is releasable, by way of the at least one holder, from the side panel or the fender without the side panel or the fender being damaged, and
the holder is a clip that is resiliently pretensioned such that when assembled in the motor vehicle, a first arm of the clip presses the first supporting strip against the side panel or the fender and a second arm of the clip presses the second support strip against the bumper.

13. The fastening arrangement as claimed in claim 1, wherein when assembled in the motor vehicle, the clip encloses at least a portion of each of the first supporting strip, the second supporting strip, the side panel or the fender, and the bumper.

14. The motor vehicle as claimed in claim 12, wherein when assembled in the motor vehicle, the clip encloses at least a portion of each of the first supporting strip, the second supporting strip, the side panel or the fender, and the bumper.

* * * * *